May 16, 1933.    J. E. JIRKA    1,909,832

SAW GRINDING MACHINE

Filed May 18, 1931

INVENTOR
*JAMES E. JIRKA*
BY Fisher, Moser & Moore
ATTORNEY

UNITED STATES PATENT OFFICE

JAMES E. JIRKA, OF CLEVELAND, OHIO

SAW GRINDING MACHINE

Application filed May 18, 1931. Serial No. 538,106.

My invention relates to saw grinding machines employed for forming or re-grinding the teeth of circular saws, and it relates more particularly to the indexing mechanism usually employed in such machines. The general object of the invention is to provide a compact indexing mechanism of simple construction which may be readily assembled and dis-assembled and in which saws of varying sizes may be readily and firmly mounted and as conveniently dismounted. A further object of the invention is to position the indexing disk within the machine where it will not be subjected to the metallic dust produced in the grinding operation. A still further object is to fixedly mount the indexing disk or wheel independently of the saw so that a saw may be secured to or removed from the indexing mechanism without disturbing the latter.

Figure 1:
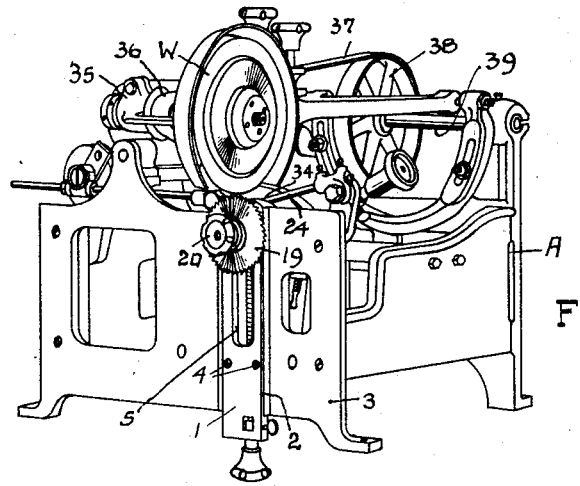
Figure 2:
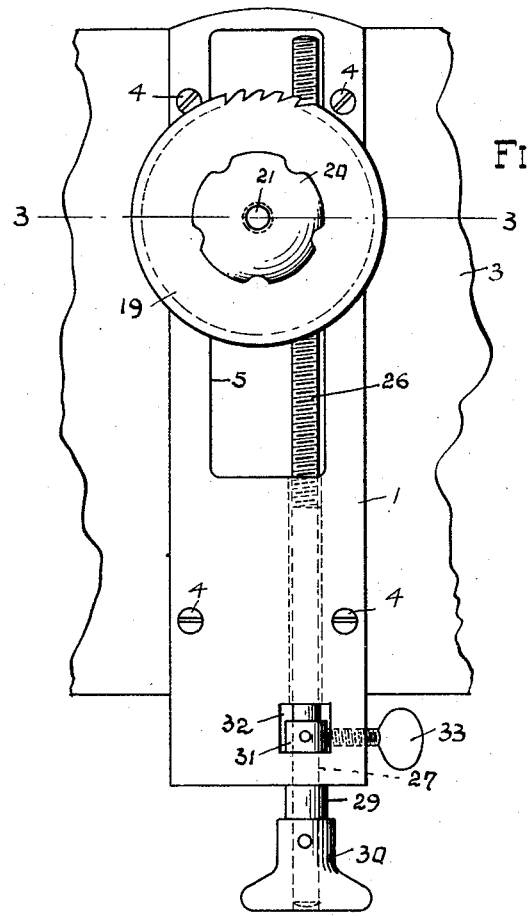
Figure 3:
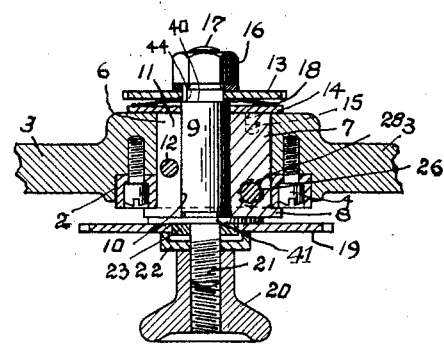

In the accompanying drawing, Figure 1 is an elevation of a grinding machine embodying the invention. Figure 2 is an enlarged front view of the indexing mechanism and Figure 3 is a section on the line 3—3 of Figure 2.

The machine A as thus shown embodies a relatively thin grinding wheel W mounted for automatic oscillatory movements toward and away from the circular disk or saw, the teeth of which are to be formed or reground. An indexing mechanism is necessary in order to properly position the saw with respect to the grinding wheel and to advance the saw step by step during the grinding operation. According to my invention this indexing mechanism comprises a heavy, preferably steel plate 1, mounted within a recess 2 formed in the front wall 3 of the machine A, screws 4 countersunk in the plate 1 being employed to secure the plate to the wall. A longitudinally disposed slot 5 formed in the plate registers with a similar slot 6 in the front wall 3. A centrally bored plate 14, secured to the inner face of wall 3 by screws 15 partially closes the slot 6 at its rear.

Mounted in the slots 5–6, for vertical movement therein is a rectangular slide member 7, the outer face of which is formed with side flanges 8 which slidably engage the outer face of the plate 1 and limit inward movement of the slide with respect to the plate 1 and wall 3. A spindle 9 projects through and is rotatably seated in an opening 10 extending horizontally through the slide member 7 to one side of the median line thereof. The slide member 7 which functions as a bearing for the spindle is formed with a slot 11 extending outwardly from the bore or opening 10 through the side of the slide. Consequently, wearing of the spindle or slide can be compensated for by tightening up the bolt 12.

A toothed indexing disk 13 is sleeved over the inner end of the spindle and is clamped against the shoulder 40 of the spindle by a nut 16, co-operating with the threaded reduced inner end 17 of the spindle 9, a bronze spring washer 18 being interposed between the plate 14 and the disk 13, for placing the spindle under longitudinal tension and offering frictional resistance to its rotation. A key 44 is employed to lock the indexing disk 13 against independent rotary movement relative to the spindle 9. The saw 19 to be re-ground is sleeved over the outer end of the spindle and is clamped against a flange 41 on the outer end of the spindle, by a nut 20 which screws on the reduced outer threaded end 21 of the spindle and forces a cupped-shaped washer 22 inwardly against the outer face of the saw. A bushing 23 partially enclosed within the cup washer 22 is employed so that saws having openings of different sizes can be snugly held against lateral movement relatively to the spindle by merely using a bushing of proper size. The indexing disk 13 is provided with the same number of teeth as the saw to be ground so that when the index is advanced the space of one tooth there will be a corresponding movement of the saw. By using the washer 22, saws of different thicknesses can be readily accommodated or where desired two or more saws may be clamped to the spindle for simultaneous grinding.

It will be seen from the foregoing that the indexing disk 13 will always remain tightly clamped to the shoulder 40 of the spindle except when the nut 16 is purposely loosened should it become necessary to replace the disk, and consequently saws 19 can be readily placed upon or removed from the spindle without disturbing the position of the disk 13 with respect to its operating rod or pawl 24. Furthermore, the disk 13 is spaced a considerable distance from the saw 19 and thus occupies a protected position behind the front wall of the machine and removed from the line of fall of dust from the grinding wheel W. In order to mount the saw 19 on the spindle it is merely necessary to remove the sleeved hand nut 20.

The slide member 7 is mounted for vertical movement so that saws of different diameters may be accurately moved to grinding position in path of movement of the oscillating grinding wheel W. Such adjustment is effected by means of a long screw 26 extending loosely through a longitudinally disposed unthreaded opening 27 in plate 1 and having operative connection with a threaded opening 28 extending vertically through the slide. A collar 29 adjacent a knob 30 on the outer end of screw 26, and a second collar 31 spaced from the collar 29 and seating against the lower wall of a small opening 32 in plate 1 secure the screw 26 against longitudinal movement but with freedom for rotary movement. Thus, rotary movement of screw 26 imparts vertical movement to the slide 7 and parts clamped thereto. A set screw 33 locks the screw 26 and slide 7 in any desired adjusted position.

As the mechanism illustrated for grinding the saw and for advancing the same step by step during the grinding operations is old and well known in the art the operation of the machine will be described very briefly. An eccentric cam 34 serves to lower the grinding disk on wheel W into engagement with the saw teeth as the latter are successively moved to grinding position, by the reciprocating pusher arm or rod 24, and also controls the movement of the pusher arm. This rod engages a tooth of the indexing disk 13 and rotates the disk and consequently the spindle 9 and saw 19 fixed thereto a sufficient distance to bring the next saw tooth into grinding position. After a tooth is ground and while the next tooth is being advanced the grinding wheel W is elevated and lowered. To permit of this movement the grinding wheel W is mounted in a rocking hub member 35, having a pulley 36 which is driven by a belt 37 from drive wheel 38 on main drive shaft 39.

What I claim, is:

In an indexing mechanism for saw grinding machines, a split bearing member slidably and nonrotatably mounted in a wall of the machine, a flanged spindle rotatably mounted in said bearing member, means for adjusting the frictional contact between said bearing member and spindle, means for adjusting the vertical position of the bearing member toward and away from the grinding wheel of the machine, said spindle having its flanged portion seated against said bearing and its outer face projecting beyond the wall of the machine for receiving a saw thereon, in position to be operated on by said grinding wheel, an indexing disk on the inner end of said spindle projecting on the inside of said wall, independent means for tightly clamping the indexing disk and the saw on their seats, and independent means for pulling said flanged portion of said spindle with predetermined force into contact with said bearing.

In testimony whereof I affix my signature.

JAMES E. JIRKA.